United States Patent [19]

Mix

[11] 4,363,857

[45] Dec. 14, 1982

[54] LAMINATED METAL-PLASTIC BATTERY GRID

[75] Inventor: Renard E. Mix, Yorktown, Ind.

[73] Assignee: General Motors Corporation, Detroit, Mich.

[21] Appl. No.: 311,921

[22] Filed: Oct. 16, 1981

[51] Int. Cl.³ ............................................. H01M 4/73
[52] U.S. Cl. ................................... 429/234; 29/623.1
[58] Field of Search ............... 429/234, 241; 29/623.1

[56] References Cited

U.S. PATENT DOCUMENTS

| | | | |
|---|---|---|---|
| 537,474 | 4/1895 | McDougall | 429/241 |
| 1,012,908 | 12/1911 | Peterson et al. | 429/138 |
| 3,269,863 | 8/1966 | Helms | 429/234 |
| 3,690,950 | 9/1972 | Wheadon et al. | 429/234 |
| 4,087,596 | 5/1978 | Sauer et al. | 429/209 |
| 4,237,205 | 12/1980 | Matter | 429/234 |

Primary Examiner—Donald L. Walton
Attorney, Agent, or Firm—Lawrence B. Plant

[57] ABSTRACT

A laminated metal-polymer support for the active material of an electric storage battery and method of making same. Anchoring tabs punched from a thin metal sheet project into openings between the grid wires of a polymer grid work and are pressed into engagement with the adjacent grid wires to secure the polymer grid work to metal sheet. Porous polymer grid works are particularly useful with deep discharge Pb-acid batteries.

7 Claims, 20 Drawing Figures

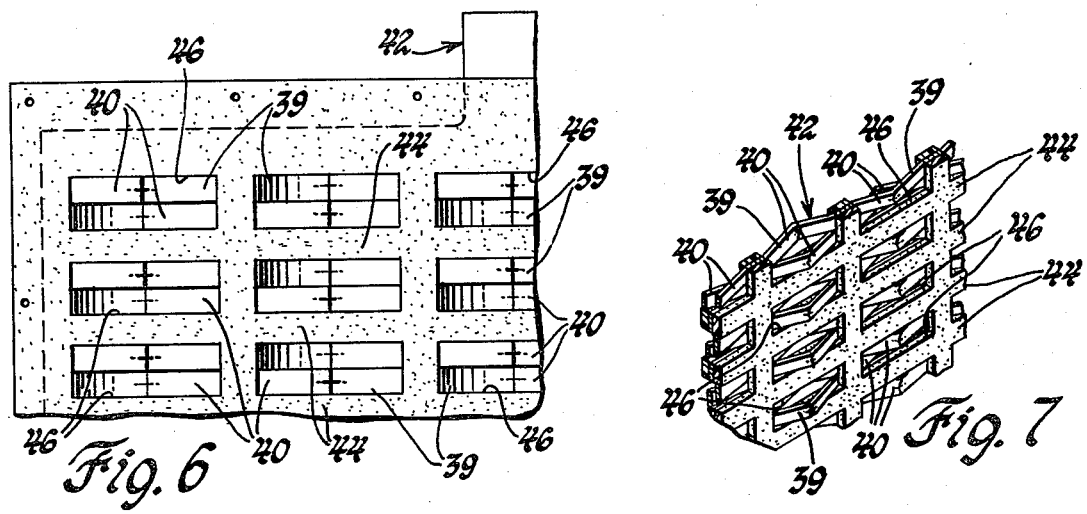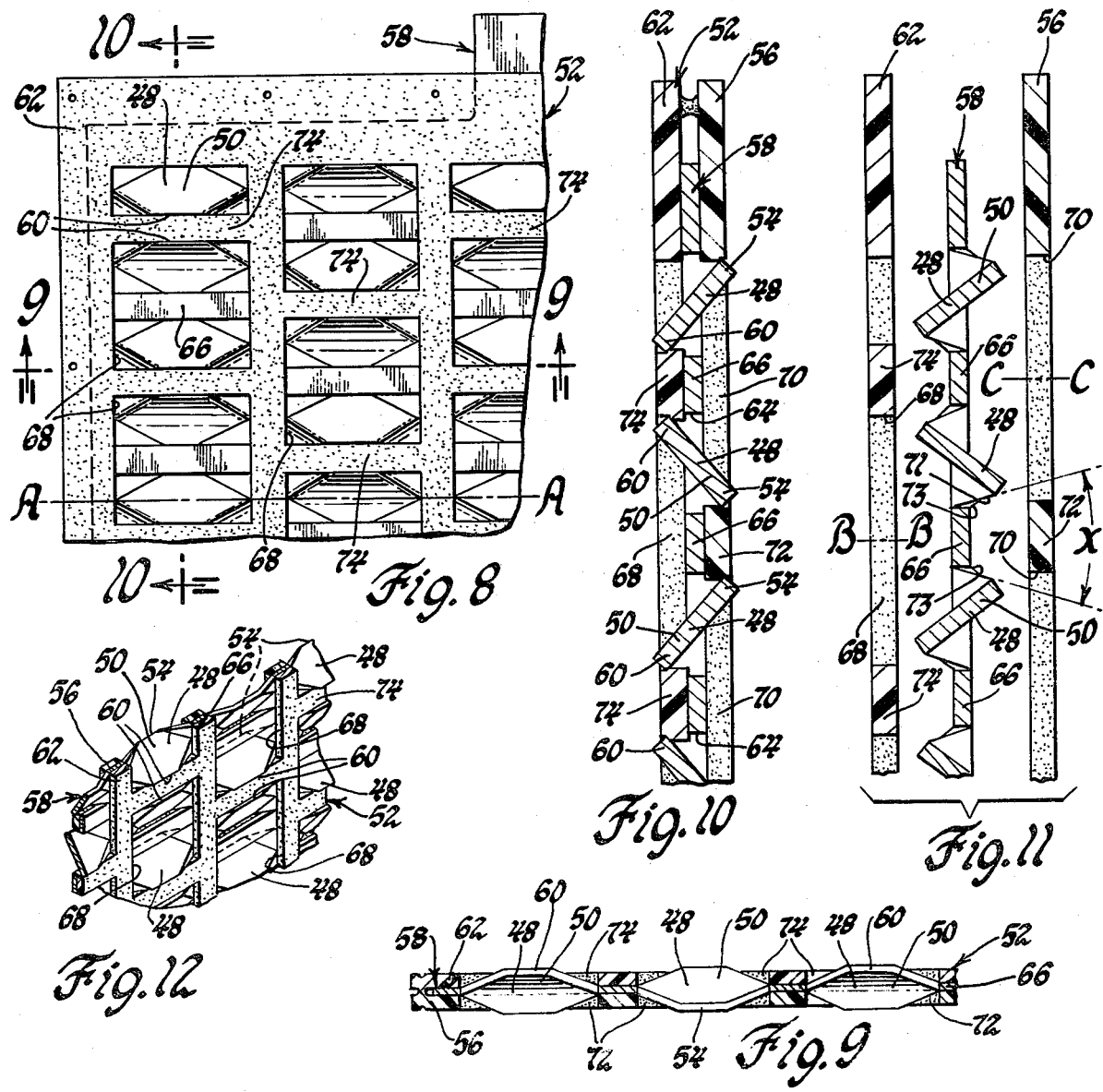

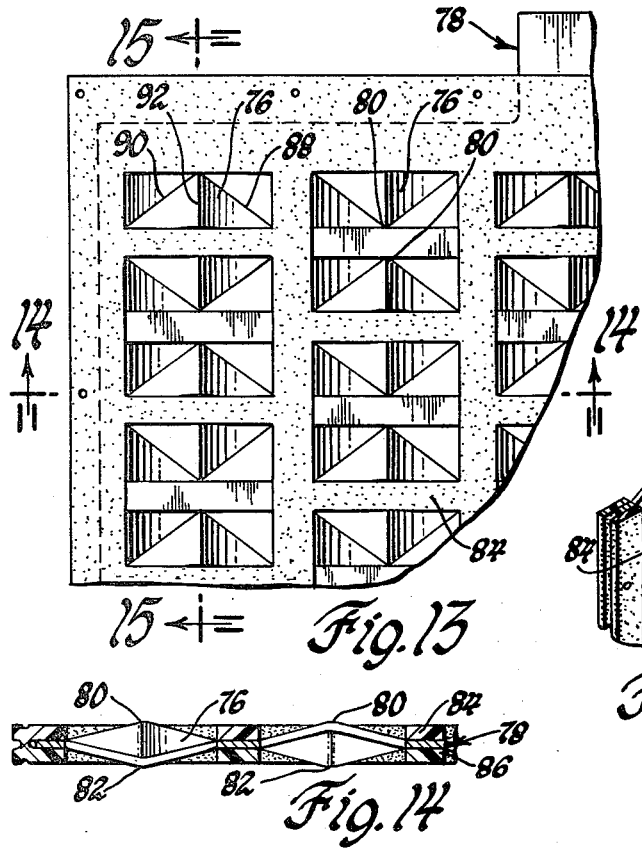
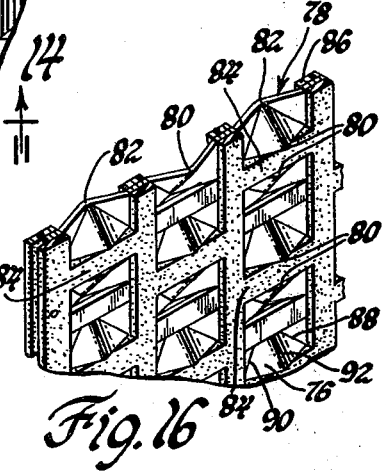
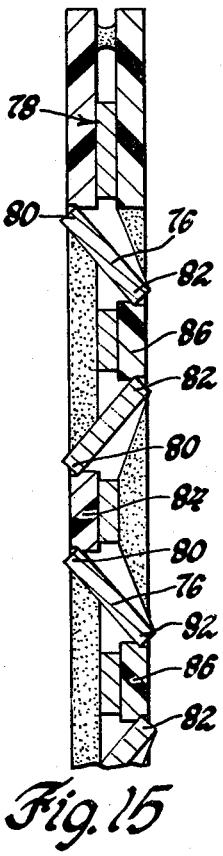
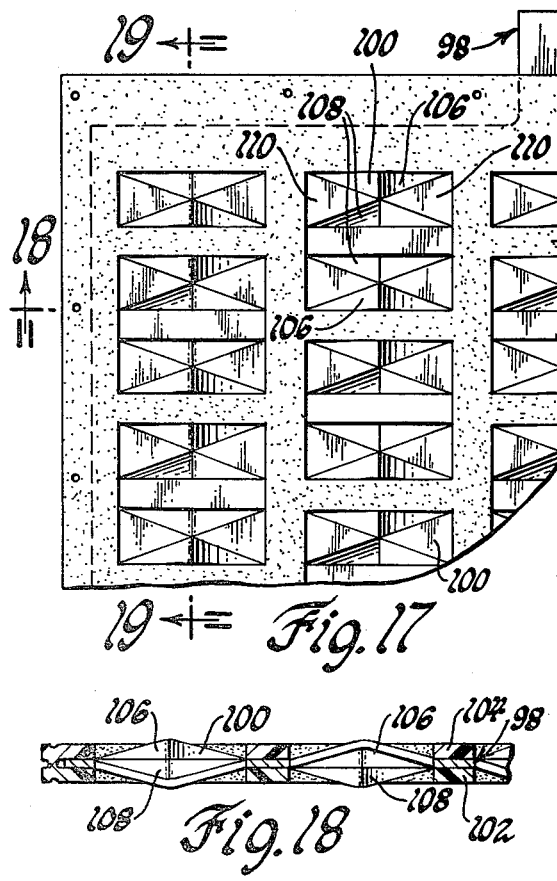
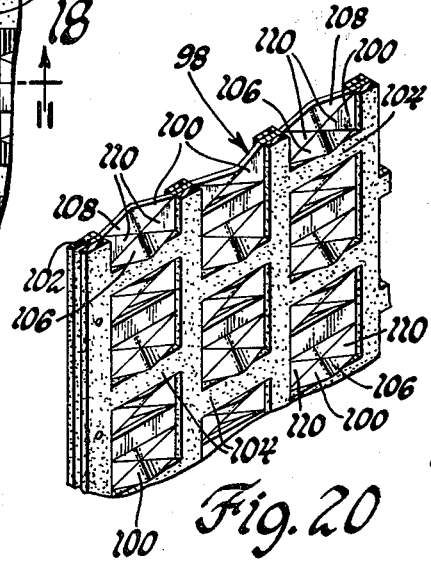
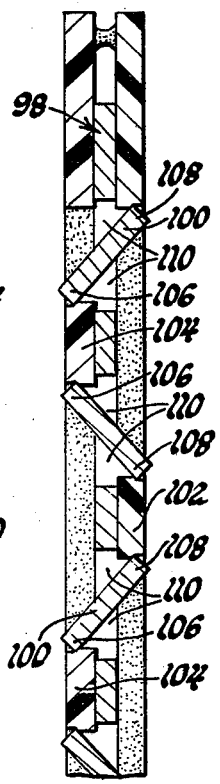

LAMINATED METAL-PLASTIC BATTERY GRID

This invention relates to laminated metal-polymer grids for mechanically and electrically supporting the active material of electric storage batteries. More specifically this invention relates to securing the polymer ply(s) to the metal ply(s) of such grids.

BACKGROUND OF THE INVENTION

Battery manufacturers are continuously seeking ways to produce lighter weight and less expensive batteries without sacrificing performance. To this end, a variety of proposals have been made for composite metal-polymer (e.g., PVC, polyethylene, polypropylene, etc.) grids for supporting (i.e., mechanically and electrically) the active material in the battery plates. In this regard, the polymers have been found to be both lighter and cheaper than the metal they replace and accordingly satisfy both objectives. Geissbauer U.S. Pat. No. 3,083,250 goes one step further and uses microporous polymer plies in oversized starter battery plate grids. While composite metal-polymer grid structures offer both weight and economic advantages, they have not received widespread commercial usage due in part to the unattractive complexity and costs associated with manufacturing such grids.

Accordingly principal objects of the present invention are to provide a laminated, metal-polymer battery grid design particularly suited to commercially practical manufacture and a process for manufacturing same. A further object of the present invention is a laminated, metal-porous polymer battery grid design particularly suited to deep discharge lead-acid batteries. These and other objects and advantages of the present invention will become more readily apparent from the detailed description thereof which follows.

BRIEF DESCRIPTION OF THE INVENTION

Product-wise, the present invention comprehends a laminated, metal-polymer grid for mechanically and electrically supporting the active material of an electric storage battery plate wherein: the polymer ply(s) comprises a peripheral frame circumscribing a network of intersecting grid wires defining a plurality of openings therebetween; the metal ply(s) comprises a thin metal sheet (e.g., lead or lead alloy) having a plurality of integral, protuberant anchoring tabs or shearings punched from, yet not detached from, the sheet; and the tabs/shearings mate with the openings in the polymer ply(s) and engage the sides of the grid wires to secure the polymer ply(s) to the metal sheet. The openings in the polymer and the perforations in the metal sheet from whence the tabs were sheared receive and retain the active material of the battery plate. Grids according to the present invention may comprise a single metal ply adjacent a single polymer ply or multiple plies of either the metal or the polymer sandwiching a single ply of the other (e.g., a single polymer ply between two metal plies).

A preferred embodiment of the invention comprehends grid for a deep discharge, cycling-type Pb-acid battery which grid has a single sheet of lead sandwiched between two porous polymer (e.g., sintered PVC powder compact) plies and wherein the plies are secured to the lead (i.e. including lead alloys) sheet by pinching the polymer grid wires between the sheared edges of adjacent shearings punched from the lead sheet. Pinching of the grid wires between the shearings better grips and retains the polymer ply(s) then other forms of shearing—wire engagement evaluated. Porous polymer plies are particularly useful in deep-discharge, motive power type, lead-acid batteries (hereafter cycling batteries) having plates which are thicker than about 0.15 cm inches and, accordingly, otherwise very difficult to irrigate with electrolyte. Unlike SLI (i.e., starter) batteries which rarely discharge more than about 30% of their capacity before recharging, cycling batteries are repeatedly called upon to yield virtually all of their capacity before being recharged. Plates for cycling batteries typically shed their active material after too few cycles. The porous plastic serves to maintain a high concentration of $H_2SO_4$ deep within the plate for improved capacity (i.e., watt-hrs/lb of active material). Moreover maintaining high concentrations of $H_2SO_4$ in the immediate regions of the lead sheet seems to retard corrosion of the lead in these cycling battery plates. Hand-in-hand with reduced grid corrosion is the opportunity to use lesser grid metal without concern for disintegration of the grid during the normal useful life of the battery. Hence further weight reductions are seen possible with porous polymer plies than with solid polymers. Finally, cycling Pb-acid plates made with porous polymer plies have demonstrated a reduced tendency toward shedding their active material during cycling, apparently due to better anchoring of the $PbO_2$ to the pores of the polymer during the formation process.

Processwise, the present invention comprehends perforating a thin flat metal sheet so as to provide a plurality of integral, protuberant tabs projecting from at least one face (preferably both faces) of the sheet to a height slightly greater than the thickness of the polymer ply to be attached to that face. The tabs are preferably sheared from the sheet by an appropriate punch and die set to provide sharp sheared edges for subsequent biting into the polymeric grid wires when the metal and polymer plies are sandwiched together. The punching operation also stretches the tab somewhat so that when it is later pressed its deformations will promote tighter engagement with the adjacent grid wires. Preferably, the punch and die shape the tabs during punching so that the tips (i.e., distal portions remote from where the tabs are rooted to the metal sheet) of adjacent tabs (i.e., projecting from the same face of the sheet) diverge slightly from each other to provide a generally V-shaped slot between adjacent tabs. Following punching, a polymeric grid having a predetermined grid-wire pattern is positioned against the face of the metal sheet. The particular grid-wire pattern is selected to complement the tab pattern punched into the metal sheet and is such that the grid wires nest within the V-shaped slot between the shearing. The wire will fit loosely at the mouth of the V-slot and tightly at the bottom of the V-slot near the roots of the shearings. At this stage in assembly, the tabs project through the openings in the grid such that the tips of the tabs lie outboard the outermost face of the polymer ply(s). The thusly formed composite is then pressed (e.g., between plates or rollers) so as to force the tabs back toward the metal sheet from whence they were punched and, in so doing, to deform them such that the sheared edges (i.e., primarily at the tab tips) bite into and tightly engage the adjacent grid wires.

In those instances where a metal sheet is sandwiched between two polymer grids, it is desirable to further secure the polymer grids directly to each other along their borders and outboard the periphery of the metal sheet. This provides added security against delamination and provides additional rigidity to the plate. While adhesives or the like might be used to join the borders, a series of spot-welds (i.e., ultrasonic) spaced around the periphery has proven most convenient and satisfactory.

DETAILED DESCRIPTION OF SPECIFIC EMBODIMENTS OF THE INVENTION

Though the invention is considered applicable to any acid or alkaline battery system (e.g., Pb-acid, Ni-Zn, Ni-Fe, etc.), it is exemplified hereafter in terms of certain Pb-acid battery embodiments depicted in the drawings wherein:

FIG. 6 is a partial front elevational view of another embodiment of a laminated grid in accordance with the present invention;

FIG. 7, is a perspective view of a segment of the grid of FIG. 6 prior to pressing;

FIG. 8 is a partial front elevational view of another embodiment of a laminated grid in accordance with the present invention;

FIG. 9 is an enlarged partial bottom sectional view in the direction 9—9 of FIG. 8;

FIG. 10 is an enlarged partial side sectional view in the direction 10—10 of FIG. 8;

FIG. 11 is an exploded view of the several plies of the grid of FIG. 8 before laminating;

FIG. 12 is a perspective view of a segment of the grid of FIG. 8 prior to pressing;

FIG. 13 is a partial front elevational view of another embodiment of a laminated grid in accordance with the present invention;

FIG. 14 is an enlarged partial bottom sectional view in the direction 14—14 of FIG. 13;

FIG. 15 is an enlarged partial side sectional view in the direction 15—15 of FIG. 13;

FIG. 16 is a perspective view of a segment of the grid of FIG. 13 prior to pressing;

FIG. 17 is a partial front elevational view of another embodiment of a laminated grid in accordance with the present invention;

FIG. 18 is an enlarged partial bottom sectional view in the direction 18—18 of FIG. 17;

FIG. 19 is an enlarged partial side sectional view in the direction 19—19 of FIG. 17; and, FIG. 20 is a perspective view of a segment of the grid of FIG. 17 prior to pressing.

Figure 1:
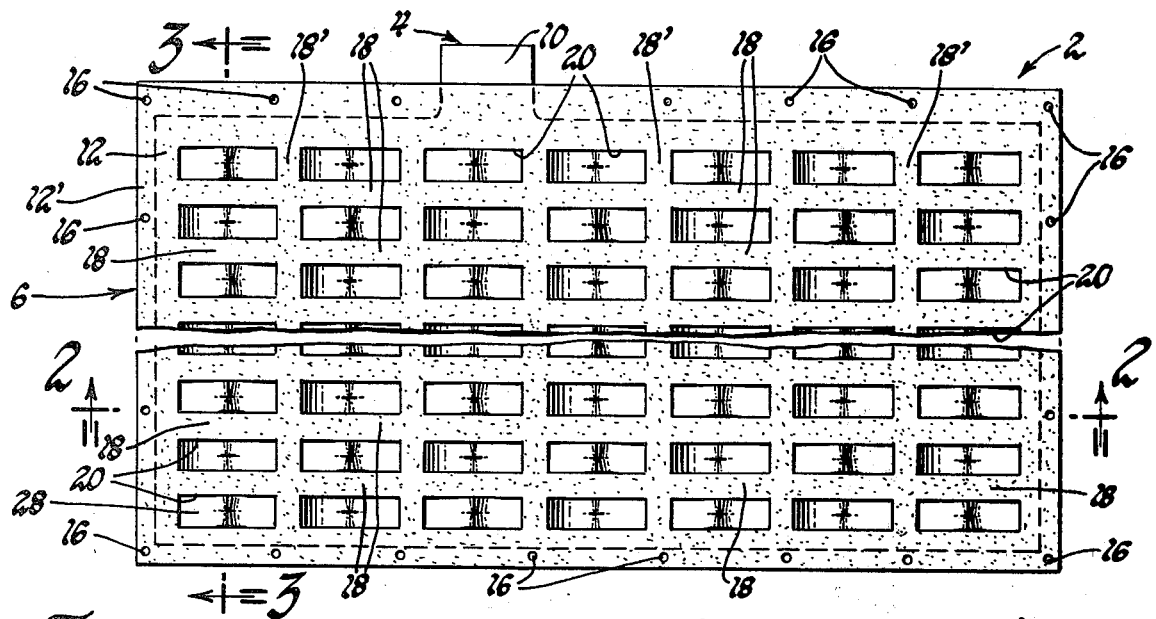
FIG. 1 is a front elevational view of one embodiment of a laminated grid in accordance with the present invention.
Figure 2:
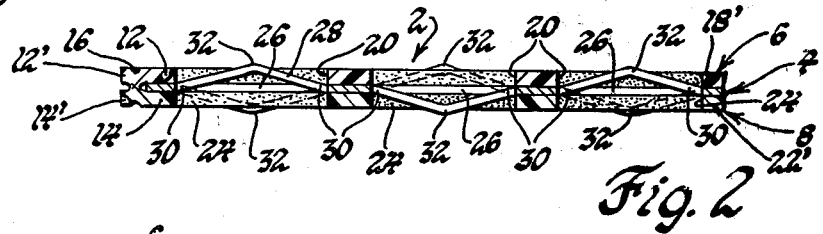
FIG. 2 is an enlarged, partial bottom sectional view in the direction 2—2 of FIG. 1.

FIGS. 1-5 illustrate one embodiment of the present invention wherein a metal-polymer composite grid 2 comprises a perforate lead sheet 4 sandwiched between two polymer grid networks 6, in the foreground, and 8, in the background. The lead sheet 4 is the primary electrical conductor for the grid and includes a lug 10 for connecting the grid to grids of like polarity in a cell element assembly. Peripheral border portions 12 and 14 encompass the grid wire networks, i.e. plies 6 and 8, respectively. The border portions 12 and 14 may extend outboard (i.e., at 12' and 14') the peripheral edges of the lead sheet 4 and may thereat be joined, one to the other, as by spot welds 16, adhesives (not shown), or other appropriate means. Securing the polymer border 12' and 14' together outboard the lead sheet provides additional strength to the grid and additional security against delamination of the several plies. The border 12 of grid 6 encompasses a plurality of intersecting horizontal grid wires 18 and vertical grid wires 18', which in turn define a plurality of interstitial grid openings 20. Similarly, the border 14 of polymer grid 8 encompasses a plurality of intersecting horizontal grid wires 22 and vertical grid wires 22' which in turn define a plurality of interstitial grid openings 24. The lead sheet 4 comprises a plurality of perforations 26 and integral protuberant shearings 28 punched therefrom. The shearings 28 are alternately punched in opposite directions away from the metal sheet 4 so as to provide shearings 28 projecting from both faces of the sheet to accommodate two sandwiching polymer plies. Where only a single polymer ply to be used, all shearings would be punched in the same direction to project from one face of the sheet 4. The shearings 28 are stretched into a generally arcuate shape (see FIGS. 2 and 5) having root portions 30, where the shearings 28 are attached to the sheet 4 and apex or distal portions 32 most remote from the sheet 4. The punching operation is such as to slightly cup the apex 32 of shearings 28, as best shown at 34 in FIG. 4. Cupping of the apices 32 narrows the width of the apices 32 to something less than the width of the openings 20 and 24 and causes the shearings 28 to taper from their roots 30 to their apices 32. This facilitates stripping the sheet 4 from the punching dies as well as entry of the shearings 28 into the polymer grid openings 20,24 during placement of the polymer grids on the sheet 4. At this stage, the shearings 28 project beyond the sheet 4 by a distance slightly greater than the thickness of the polymer grids 6 and 8 which are to be attached thereto and such that the apices 32 will lie outboard the faces of polymer grids 6 and 8 after assembly, but before pressing.

Figure 3:
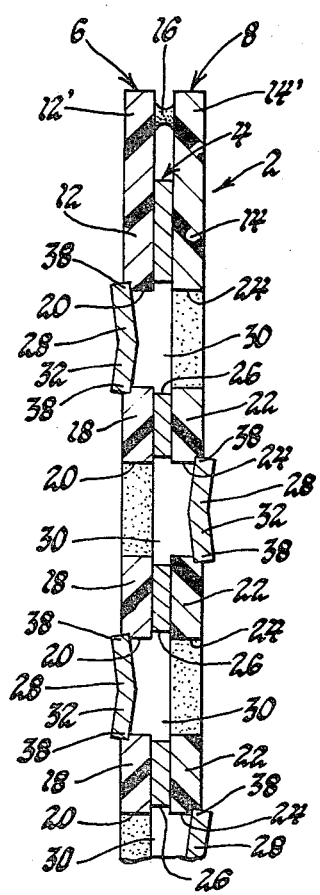
FIG. 3 is an enlarged partial side sectional view in the direction 3—3 of FIG. 1.
Figure 4:
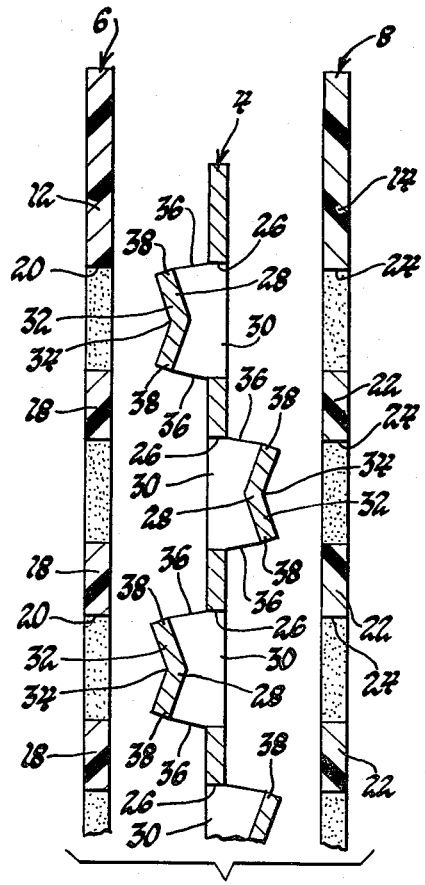
FIG. 4 is an exploded view of the several plies of the grid of FIG. 1 before laminating.
Figure 5:
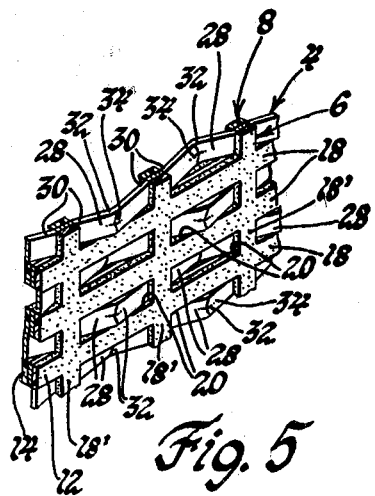
FIG. 5 is a perspective view of a segment of the grid of FIG. 1 prior to pressing.

During assembly, the polymer grids 6 and 8 are positioned on opposite sides of the sheet 4 such that the several shearings 28 register with the openings 20 and 24 in the polymer grids 6 and 8, respectively. The widths of the openings 20 and 24 are slightly greater than the width of the shearings 28 at their cupped apices and slightly less than the width of the shearings 28 at their roots 30 such that the shearings 28 will engage the openings in a progressively tighter, interference fit when the polymer plies are pushed toward the roots 30. The several plies 6 and 8 are then joined to the sheet 4 such that the sheared edges 36 of the shearings 28 tightly engage grid wires 18 and 22 lying on either side of the shearing 28. Finally the several plies are pressed tightly together (e.g., as by plates or rollers) such as to force the shearings 28 back down toward the parent metal sheet 4 from whence they came and to distort and laterally expand the cupped shearing 28 tightly against the flanking polymer grid wires 18 and 22. This flattening of the cupped apices further causes the sharp edges 38 at the apices 32 of the shearings 28 to bite into the adjacent polymer grid wires, as best illustrated in FIG. 3.

FIGS. 6 and 7 depict another embodiment similar to that disclosed in conjunction with FIGS. 1-5. Whereas the embodiment shown in FIGS. 1-5 shows a single shearing 28 substantially completely filling each opening 20 and 24 in the polymer grids 6, 8, this embodiment (i.e., FIGS. 6 and 7) employs sets 39 of contiguous shearings 40 which are only half the width of the shearings 28 of FIGS. 1-5 and fill only half the openings. In this embodiment, contiguous shearings 40 are punched in opposite directions from the metal sheet 42 and each engages only one adjacent horizontal grid wire 44 as best shown in FIG. 7. The shearings 40 are otherwise similar in shape (e.g. cupped apex) to the shearings 28. In this embodiment every opening 46 in each ply receives at least one of the shearings 40, whereas in the FIGS. 1-5 embodiment only half the openings in each polymer ply received a shearing 28. As with the previous design, the polymer-metal sandwich is pressed to distort the shearings 40 back toward the metal sheet 42 and to cause the sheared edges thereof to engage the adjacent horizontal grid wires 44 for anchoring the polymer grids to the metal sheet 42.

FIGS. 8-12, 13-16 and 17-20 depict three variations of preferred embodiments of the present invention. In these embodiments, polymer grid wires are pinched or gripped between adjacent shearings on the same side of the metal sheet. In each instance, the shearings is formed by rotating the sheared out metal obliquely to the principal plane of the starting metal sheet such that half the shearing projects from one face of the parent metal sheet and half the shearing projects from the opposite face. In these designs, the openings in the polymer grids on either side of the metal sheet are offset with respect to each other such that every grid wire of each sheet can be pinched between adjacent shearings for maximum polymer retention.

In FIGS. 8-12, the shearings 48 comprise a substantially planar polygonal metal wafer 50 lying at an oblique angle to the metal sheet 58 and traversing the full thickness of the metal-polymer composite grid 52 such that one edge 54 of the wafer 50 engages the polymer grid 56 on one side of the metal sheet 58 and another edge 60 engages the polymer grid 62 on the other side of the metal sheet 58. More specifically, lead sheet 58 is perforated at 64 to provide wafer-like shearings 48 having a generally polygonal shape as best shown in FIGS. 8 and 12. The punching tool rotates the sheared wafer 50 about an axis A—A, (see FIG. 8) to an angle of approximately 60° from the major plane of the metal sheet 58. Between each rotated wafer 50 lies a web of metal 66 which remains substantially in the plane of the starting sheet 58. The centers of the openings 68 and 70 in the polymer plies 62 and 56 respectively are offset one from the other by an amount equal to ½ the size of the openings. As best depicted in FIG. 11 this is illustrated by the offset centerlines B—B of opening 68 and C—C of opening 70. By this arrangement, each horizontal metal web 66 abuts a polymer grid wire 72 or 74 in an alternating pattern such that the polymer grid wires 72 of ply 56 engage every other web 66 on one face of the grid while the polymer grid wires 74 of ply 62 engage the remaining webs 66 on the other face of the grid as best shown in FIGS. 10 and 12. Each opening 68 and 70 then will have portions of at least two shearings 48 projecting into them, and the sheared edges 54—54 or 60—60 of adjacent shearings on one side of the metal sheet 58 will engage and grip appropriate grid wires 72 and 74 respectively therebetween. Rotating the wafers 50 in the manner described inherently yield a V-shaped notch 71 having draft angle X (see FIG. 11). As the width of the grid wires 72 and 74 is greater than the width of the metal webs 66, the V-notch 71 facilitates the tight interference fit between the grid wires and the roots 73 of the wafers 50 during assembly. Following assembly the composite is pressed to rotate the shearings back toward the perforate metal sheets 58 from whence they came and, in so doing, cause the sheared edges 54 and 60 of the several shearings to tightly engage the polymer grid wires 72 and 74 respectively therebetween.

The embodiments shown in FIGS. 13-16 and 17-20 are similar to that shown in FIGS. 8-12 but differ therefrom only with respect to the shape of the shearings.

FIGS. 13-16 depict an embodiment wherein the shearings 76 have a moth-wing-like configuration rather than a wafer-like configuration. More specifically, the metal sheet 78 is perforated to provide a plurality of shearings 76 which, traverse the complete thickness of the composite grid such that the opposite ends 80 and 82 thereof engage polymer grid wires 84 and 86 respectively lying on opposite sides of the metal sheet 78. The dies used to punch the shearings 76 are such as to crease the shearings 76 at several locations 88, 90 and 92 to provide a shearing 76 having a generally moth-wing-like configuration as best seen in FIG. 16. Following pressing the opposite ends or apices 80 and 82 of the shearings 76 bite into grid wires 84 and 86 respectively to trap the grid wires between adjacent shearings.

FIGS. 17-20 depict an embodiment similar to that depicted in FIGS. 13-16 but differing therefrom only with respect to the shape of and manner in which the shearings are punched from the metal sheet. More specifically, the metal sheet 98 is perforated to provide a plurality of shearings 100 for engaging the polymer grid wires 102 and 104 in the manner discussed above. In this embodiment, however, the shearings 100 are formed with two somewhat smaller moth-wing configurations 106 and 108 separated by triangular webs of metal 110 which remain in the principal plane of the metal sheet 78. As before pressing of the assembled composite traps the grid wires between the shearings and anchor the polymer plies to the metal ply.

The pore size of the irrigating, porous polymer grids is seen to be such as to serve both as a reservoir for electrolyte and a wick for keeping the electrolyte concentrations up within the electrode. Active material utilization improvements in the range of about 3% to 5% have been obtained in cycling-type Pb-acid batteries using polymer grids made by sintering reground PVC separator material to form a grid having an average pore size of about 25 microns.

While this invention has been disclosed primarily in terms of specific embodiments thereof it is not intended to be limited thereto but rather only to the extent defined in the claims which follow.

The embodiments of the invention in which an exclusive property or privilege is claimed are defined as follows:

1. A laminated support for the active material of an electric storage battery plate comprising:
    a perforate metal sheet having a plurality of integral, protuberant, anchoring tabs projecting outwardly from a face of said sheet, and a plurality of perforations from whence said tabs were formed;
    at least one polymeric grid contiguously overlying a major portion of said face, said grid comprising a network of intersecting grid wires defining a plurality of openings therebetween; and said tabs projecting into said openings and engaging said grid wires to secure said grid to said face.

2. A laminated support for the active material of an electric storage battery plate comprising:

a perforate metal sheet having first and second faces on opposite sides thereof, a plurality of integral, protuberant, anchoring tabs projecting outwardly from each of said faces, and a plurality of perforations from whence said tabs were formed;

a polymeric grid contiguously overlying a major portion of each of said faces, said grids each comprising a network of intersecting grid wires defining a plurality of openings therebetween; and said tabs projecting into said openings and engaging said grid wires to secure said grids to said faces.

3. A laminated support for the active material of an electric storage battery plate comprising:

a perforate metal sheet having a plurality of integral, protuberant shearings punched therefrom and projecting outwardly from a face of said sheet, said shearings each having a sheared edge thereon;

at least one polymeric grid comprising a network of intersecting grid wires defining a plurality of openings therebetween, said grid contiguously overlying a major portion of said face; and said shearings projecting into said openings and pinching said grid wires between the sheared edges of adjacent shearings to secure said grid to said face.

4. A laminated support for supporting the active material of an electric storage battery plate comprising:

a perforate metal sheet having first and second faces on opposite sides thereof, a plurality of integral, protuberant shearings projecting outwardly from each of said faces, and a plurality of perforations from whence said shearings were punched, said shearings each having a sheared edge thereon;

a microporous polymeric grid contiguously overlying major portions of each of said faces for irrigating said active material with battery electrolyte, said grids each comprising a network of intersecting grid wires defining a plurality of openings therebetween; and said shearings projecting into said openings and pinching said grid wires between the sheared edges of adjacent shearings to secure a said grid to each of said faces.

5. A laminated support for the active material of an electric storage battery plate comprising:

a perforate metal sheet having first and second faces on opposite sides thereof, a plurality of integral protuberant anchoring tabs projecting outwardly from each of said faces, and a plurality of perforations from whence said tabs were formed;

a polymeric grid contiguously overlying each of said faces, said grids each comprising a peripheral border encompassing a network of intersecting grid wires defining a plurality of openings therebetween;

said tabs projecting into said openings and securely engaging said grid wires; and said borders being joined one to the other outboard the periphery of said sheet.

6. A process for making a laminated metal-polymer composite support for the active material of an electric storage battery comprising the steps of:

perforating a thin metal sheet so as to provide a plurality of integral, protuberant shearings projecting from at least one face of said sheet, said shearings each being rooted at said sheet and having a distal end spaced from said face by a first height;

positioning a polymeric grid against said one face, said grid comprising a network of intersecting grid wires defining a plurality of openings therebetween and having a thickness less than said first height, said positioning being such that said shearings pass through said openings such that said distal ends lie outboard said grid; and thereafter pressing said distal ends into engagement with said grid wires to secure said grid to said sheet.

7. A process for making a laminated metal-polymer composite support for the active material of an electric storage battery comprising the steps of:

perforating a thin metal sheet so as to provide a plurality of integral, protuberant shearings projecting from the opposite faces of said sheet, said shearings each (1) being rooted at said sheet, (2) having distal ends spaced from said faces by a first height and (3) including sheared edges lying in planes at acute angles to the principal plane of the sheet such that the edges of adjacent shearings projecting from any one face diverge from that face;

positioning a polymeric grids against said faces, said grids each comprising a network of intersecting grid wires defining a plurality of openings therebetween and having a thickness less than said first height, said positioning being such that said grid wires lie between the diverging edges of said adjacent shearings and said distal ends extend outboard said grid; and pressing said distal ends so as to force said sheared edges of adjacent shearings into pinching engagement of the grid wires positioned therebetween to secure said grid to said sheet.

* * * * *